(12) United States Patent
Lowder et al.

(10) Patent No.: US 9,806,488 B2
(45) Date of Patent: Oct. 31, 2017

(54) ADAPTIVE BOOST CONTROL FOR GATING PICOSECOND PULSED FIBER LASERS

(71) Applicant: nLIGHT, Inc., Vancouver, WA (US)

(72) Inventors: Tyson Lowder, Vancouver, WA (US); Timothy N. Kutscha, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/197,443

(22) Filed: Jun. 29, 2016

(65) Prior Publication Data
US 2017/0005451 A1   Jan. 5, 2017

Related U.S. Application Data (60) Provisional application No. 62/186,905, filed on Jun. 30, 2015.

(51) Int. Cl.
| | | |
|---|---|---|
| *H01S 3/10* | (2006.01) | |
| *H01S 3/094* | (2006.01) | |
| *H01S 3/067* | (2006.01) | |

(52) U.S. Cl.
CPC .... *H01S 3/094076* (2013.01); *H01S 3/10007* (2013.01); *H01S 3/06754* (2013.01); *H01S 3/10038* (2013.01); *H01S 3/10069* (2013.01)

(58) Field of Classification Search
CPC ............. H01S 3/06754; H01S 3/10069; H01S 3/094076
See application file for complete search history.

(56) References Cited

U.S. PATENT DOCUMENTS

| | | | |
|---|---|---|---|
| 4,166,985 A | | 9/1979 | White et al. |
| 4,264,870 A | | 4/1981 | Avicola |
| 4,503,403 A | | 3/1985 | Taylor et al. |
| 4,608,697 A | | 8/1986 | Coldren |
| 4,635,246 A | | 1/1987 | Taylor et al. |
| 4,866,720 A | | 9/1989 | Holly |
| 5,570,227 A | * | 10/1996 | Nabeyama ............ H01S 3/1301 359/337 |
| 5,778,015 A | | 7/1998 | Gunning et al. |
| 5,778,016 A | | 7/1998 | Sucha et al. |

(Continued)

FOREIGN PATENT DOCUMENTS

WO   WO 2014/152766   9/2014

OTHER PUBLICATIONS

Final Office action dated Jul. 17, 2014, from U.S. Appl. No. 13/835,354, 18 pages.

(Continued)

*Primary Examiner* — Eric Bolda
(74) *Attorney, Agent, or Firm* — Klarquist Sparkman, LLP (57) ABSTRACT

A method includes applying a boost pump signal to a pump laser of a laser system based on a preceding off duration associated with the laser system, and applying a forward pump signal to the pump laser. A laser system includes a seed laser situated to generate seed optical pulses, a pump laser situated to generate pump optical radiation, a fiber amplifier situated to receive the pump optical radiation and the seed optical pulses, and a controller situated to select a pump boost duration or pump boost magnitude based on an off duration associated with the laser system.

25 Claims, 11 Drawing Sheets

(56) References Cited

U.S. PATENT DOCUMENTS

| | | | |
|---|---|---|---|
| 5,812,569 A * | 9/1998 | Walker | H01S 3/11 372/10 |
| 5,987,042 A | 11/1999 | Staver et al. | |
| 6,208,672 B1 | 3/2001 | Gunning et al. | |
| 6,243,195 B1 | 6/2001 | Pedersen et al. | |
| 6,590,922 B2 | 7/2003 | Onkels et al. | |
| 6,661,820 B1 | 12/2003 | Camilleri et al. | |
| 6,807,001 B1 * | 10/2004 | Ranka | H01S 3/1312 359/334 |
| 6,980,574 B1 * | 12/2005 | Yin | H01S 3/109 372/25 |
| 7,324,788 B2 | 1/2008 | Ramet et al. | |
| 7,391,794 B2 | 6/2008 | Kane | |
| 7,582,848 B2 | 9/2009 | Smart | |
| 7,608,808 B2 | 10/2009 | Kuramoto | |
| 7,964,819 B2 | 6/2011 | Bruland | |
| 8,160,113 B2 | 4/2012 | Adams et al. | |
| 8,254,419 B1 | 8/2012 | Savage-Leuchs et al. | |
| 8,532,151 B2 | 9/2013 | Li et al. | |
| 2002/0097761 A1 | 7/2002 | Sucha et al. | |
| 2002/0114370 A1 | 8/2002 | Onkels et al. | |
| 2002/0196823 A1 | 12/2002 | Nakao et al. | |
| 2003/0197918 A1 | 10/2003 | Ng et al. | |
| 2003/0202168 A1 | 10/2003 | Barenz et al. | |
| 2004/0190119 A1 | 9/2004 | Tauser et al. | |
| 2007/0064747 A1 | 3/2007 | Feve et al. | |
| 2007/0223544 A1 | 9/2007 | Yamazaki et al. | |
| 2007/0268940 A1 | 11/2007 | Luo et al. | |
| 2008/0089369 A1 | 4/2008 | Luo et al. | |
| 2009/0046746 A1 | 2/2009 | Munroe et al. | |
| 2009/0296755 A1 | 12/2009 | Brown et al. | |
| 2010/0038558 A1 | 2/2010 | Yamazoe | |
| 2010/0189136 A1 | 7/2010 | Gapontsev et al. | |
| 2010/0189141 A1 | 7/2010 | Zhang et al. | |
| 2011/0062127 A1 | 3/2011 | Gu et al. | |
| 2011/0085576 A1 | 4/2011 | Crawford et al. | |
| 2011/0122912 A1 | 5/2011 | Benjamin et al. | |
| 2011/0142084 A1 | 6/2011 | Reid et al. | |
| 2012/0087386 A1 | 4/2012 | Brown et al. | |
| 2012/0116371 A1 * | 5/2012 | Boutoussov | A61B 18/20 606/2 |
| 2012/0242973 A1 | 9/2012 | Tünnermann et al. | |
| 2013/0114627 A1 | 5/2013 | Filgas et al. | |
| 2015/0263481 A1 * | 9/2015 | Fanning | H01S 3/094076 219/121.61 |

OTHER PUBLICATIONS

Final Office action dated Feb. 3, 2015, from U.S. Appl. No. 13/758,904, 18 pages.

First Office Action from Chinese Patent Application No. 201410044843.1, dated May 30, 2016, 20 pages (with English translation).

International Search Report and Written Opinion from International Application No. PCT/US2014/027709, dated Sep. 12, 2014, 10 pages.

Johann Nilsson, "High-power fiber lasers: Surge to power," SRC Annual Meeting, pp. 21-23, Sep. 19-21, 2005.

Koechner, "Solid State Laser Engineering," Springer Science & Business Media, NY, 5:268-270 (2006).

Margalit et al., "Injection locking of an actively mode-locked semiconductor laser," Optics Letters, 19(24): 2125-2127 (Dec. 15, 1994).

Office action dated Feb. 4, 2014, from U.S. Appl. No. 13/835,354, 15 pages.

Office action dated Apr. 10, 2014, from U.S. Appl. No. 13/758,904, 16 pages.

Office action dated Dec. 26, 2014, from U.S. Appl. No. 13/835,354, 20 pages.

Seo et al., "Timing jitter reduction of gain-switched DFB laser by external injection-seeding," Elec. Lett. 32(1): 44-45 (Jan. 4, 1996).

\* cited by examiner

ADAPTIVE BOOST CONTROL FOR GATING PICOSECOND PULSED FIBER LASERS

CROSS REFERENCE TO RELATED APPLICATION

This application claims the benefit of U.S. Provisional Patent Application No. 62/186,905, filed Jun. 30, 2015, which is incorporated by reference herein in its entirety.

FIELD

The field pertains to picosecond pulsed fiber lasers.

BACKGROUND

Pulsed fiber lasers are typically configured to generate high power optical pulses for various specialized materials processing applications. In some applications pulses are required to be delivered accurately to regions of a target so as to form patterns. The pulses may also need to be applied at different powers, repetition rates, pulse energies, pulse burst frequencies, or with other laser parameters varied according to process requirements. In order to deliver pulses to different regions of the target, pulsed fiber laser output beams are energized and de-energized (i.e., turned on and off) with a gate signal so that output beams are delivered only to selected regions to be processed. Often it is found that the rising edge dynamics of the pulsed fiber laser output beams can vary considerably during operation, leading to poor or inconsistent performance. Accordingly, a need remains for methods, apparatus, and systems without these drawbacks.

SUMMARY

According to one aspect, a method includes applying a boost pump signal to a pump laser of a laser system based on a preceding off duration associated with the laser system, and applying a forward pump signal to the pump laser. In some examples, the off duration is detected. In further examples, the off duration is associated with a laser gate signal, and the boost pump signal is applied in response to the laser gate signal. In representative examples, a duration of the boost pump signal is determined based on stored pump signal values associated with a plurality of off durations, and the boost pump signal is applied in response to a gate signal, wherein the forward pump signal is applied upon completion of the boost pump signal.

According to another aspect, a laser system includes a seed laser situated to generate seed optical pulses, a pump laser situated to generate pump optical radiation, a fiber amplifier situated to receive the pump optical radiation and the seed optical pulses, and a controller situated to select a pump boost duration or pump boost magnitude based on an off duration associated with the laser system. In some examples, the laser system further includes a memory that stores pump boost durations or pump boost magnitudes corresponding to a plurality of off durations, and programmable logic configured to obtain the selected pump boost duration or pump boost magnitude based on the stored pump boost durations or pump boost magnitudes and the detected off duration.

According to a further aspect, a method, includes detecting an off duration associated with termination of a first gating signal and initiation of a second gating signal, applying a first pump laser current in response to the second pulsed gating signal, the first pump laser current having a duration associated with the detected off duration, and switching the first pump laser current to a second pump laser current upon termination of the first pump laser current.

The foregoing and other objects, features, and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

Figure 1:
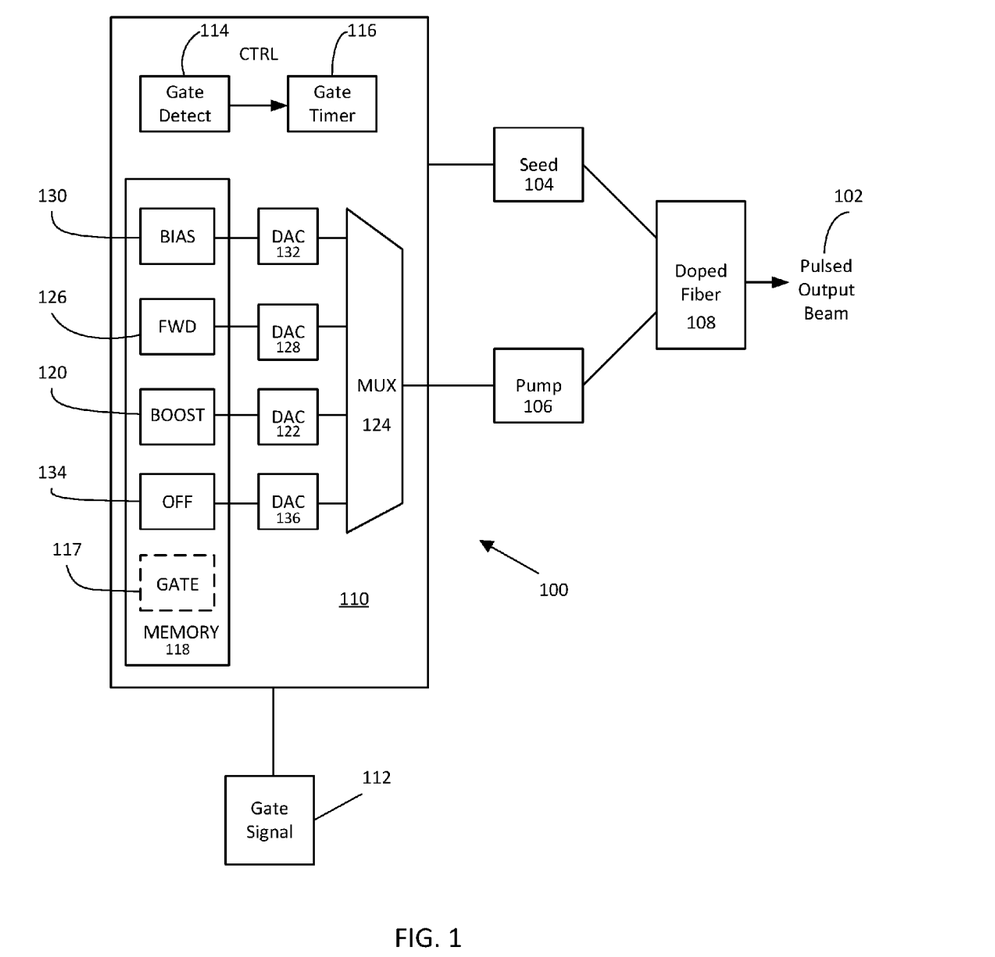
FIG. 1 is a schematic of a laser apparatus generating a pulsed output beam for laser processing.

Referring to FIG. 1, a laser system 100 situated to generate a pulsed output beam 102 includes a seed laser 104 and pump source 106 coupled to a doped fiber 108. The pump source 106 generates optical pump radiation that is provided to the doped fiber 108 so as to excite active dopants in a core of the doped fiber 108. The seed laser 104 generates seed pulses that increase in amplitude via propagation through the core of the doped fiber 108 excited by the pump source 106. Pulses associated with the pulsed output beam 102 have various characteristics including pulse duration, pulse power, pulse energy, pulse repetition rate, pulse wavelength, pulse burst frequency, etc. The seed laser 104 can include diode laser sources such as gain switched diodes, fiber lasers such as mode-locked fiber lasers, solid state lasers, etc. The pump source 106 can include diode lasers, fiber lasers, solid state lasers, or other lasers. The doped fiber 108 can include a fiber amplifier that is situated in a master oscillator power amplifier (MOPA) configuration, with the seed laser 104 providing the master oscillation. One or more preamplifiers (not shown) can be disposed between the seed laser 104 and the doped fiber 108 to provide staged amplification. Pump sources 106 can be coupled to the doped fiber 108 in a variety of ways, including co-propagating, counter-propagating, bi-directionally, side-coupled, etc.

A controller 110 is situated to control timing and signal attributes associated with the laser system 100, including the pulsed output beam 102. A gate signal source 112 couples a gate signal to the controller 110 so as to signal when the pulsed output beam 102 should be emitting with desired attributes or not emitting, in accordance with process requirements. The gate signal can provide a series of on/off signals with each on- or off-signal varying in duration with respect to one or more adjacent on- or off-signals. The gate signal can also be associated with changes to other characteristics of the pulsed output beam 102, such as pulse power or repetition rate. In some examples, the gate signal is detected during operation of the laser system 100 by a gate detector 114 of the controller 110, and in other examples, the gate signal can be preloaded in a portion 117 of a memory 118 associated with the laser system 100 for detection through software analysis of the gate signal 112. Detection can also be through sensing, probing, and measurement.

For detection during operation, the gate detector 114 typically detects a termination of an operational state associated with the gate signal and initiates a gate timer 116. The gate timer 116 is then terminated at the initiation of a subsequent operational state associated with a subsequent gate signal and stores the resulting gate signal off duration in the memory 118 of the controller 110 or establishes a look-up table index associated with the resulting gate signal off duration. Based on the off duration, the controller 110 selects a boost pump current for delivery to the pump source 106 by supplying a boost current value retrieved from a memory portion 120 to a digital-analog converter (DAC) 122. The DAC 122 supplies an analog value to a multiplexer 124 that is associated with the retrieved boost current value coupled to the pump source 106. The boost current value selected by the controller 110 can vary in duration, magnitude, or both, based on the detected off duration. The pump boost current supplied to the pump source 106 can be selected so as to provide for a suitable rise time and overshoot in the pulse output beam 102 that correspond to the timing of the gate signal and that can reduce likelihood of damage to the laser system 100 or non-conforming pulse characteristics. For example, the rising edge dynamics of optical packets can vary considerably as gate signal off duration changes and energy stored in a laser medium (e.g., laser pump sources, laser oscillators, and laser amplifiers) varies.

During the operational state of the gate signal (e.g., where a laser driver is in an on state) and at a termination of the selected boost pump current, the controller 110 selects a forward pump current based on a forward pump current value stored in a memory portion 126 and supplies the forward pump current value to a corresponding DAC 128. An analog forward pump current value is provided to the multiplexer 124 so that the selected forward pump current can be provided to the pump source 106, typically for the remaining duration of the operational state of the gate signal 112. Upon termination of the operational state of the gate signal, the forward pump current is also terminated. A bias current value stored in a memory portion 130 is selected by the controller 110. The selected bias current value is converted to an analog value with a corresponding DAC 132 so that the bias current value can be received by the multiplexer 124 and directed to the pump source 106. A zero current value may also be stored in a memory portion 134 and supplied to a corresponding DAC 136 so that an analog off value can be supplied to the multiplexer 124 for directing the pump source 106 into an off-state. In some examples, the multiplexer 124 can be a digital multiplexer and coupled to the memory 118 with one or more DACs receiving the digital signal from the digital multiplexer to convert to an analog signal.

Controller 110 can include one or more components, such as relays, switches, sensors, transistors, programmable logic devices, application specific integrated circuits, field programmable gate arrays, complex programmable logic devices, general purpose computers, specific purpose computers, etc. Components can be singular or distributed as convenient. Memory 118 can include volatile and non-volatile memory and can be housed in separate components of the controller 110. Various memory types can include gates, registers, SRAM, DRAM, EEPROM, etc. Different components of the laser system 100 and controller 110 can communicate wirelessly.

Figure 2A:
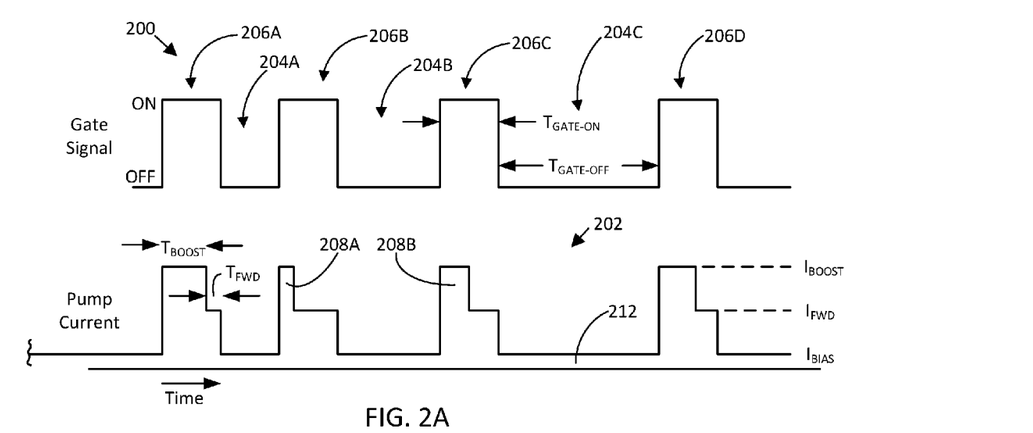
FIG. 2A contains plots of a gate signal and a corresponding pump current with respect to time.
Figure 2B:
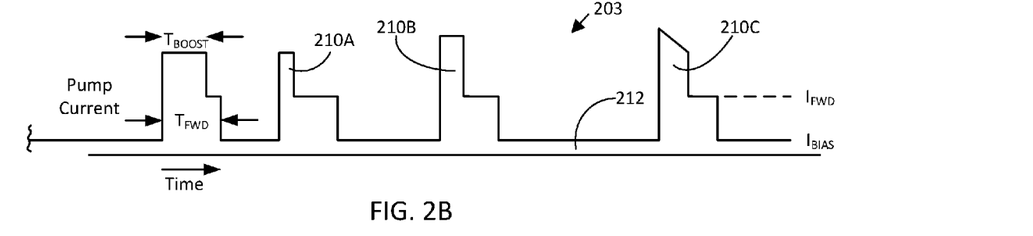
FIG. 2B is a plot of pump current with respect to time.

FIGS. 2A and 2B show a gate signal 200, pump current 202, and another pump current 203 of a laser system supplied in response to or based on the gate signal 200. The gate signal 200 includes a series of off-signal states 204A-204C having durations $T_{GATE-OFF}$, which can differ for each of the off-signal states 204A-204C. The gate signal 200 also includes a series of on-signal states 206A-206D having durations $T_{GATE-ON}$ which can be different from each other, and can be independent of the off-signal states 204. For clarity, in FIG. 2A each of the on-signal states 206A-206D is shown as having the same duration, though it will be appreciated that such durations can vary according to laser processing requirements.

For a particular on-signal state, the pump current applied in response includes a pump boost current $I_{BOOST}$ applied for a pump boost duration $T_{BOOST}$ and a pump forward current $I_{FWD}$ applied for a pump forward current duration $T_{FWD}$. As shown in FIG. 2A, in some examples, the pump boost current $I_{BOOST}$ can be applied for a pump boost current duration and the pump forward current can be applied for a pump forward current duration. In other examples, as shown in FIG. 2B, a pump forward current can be applied for a pump boost current duration and a pump forward current duration. For suitable short on-signal states, the duration $T_{BOOST}$ of the pump boost current may span the duration of the on-signal state. A bias current 212 is typically applied for a duration $T_{BIAS}$ associated with each off-signal state 204.

Figure 3:
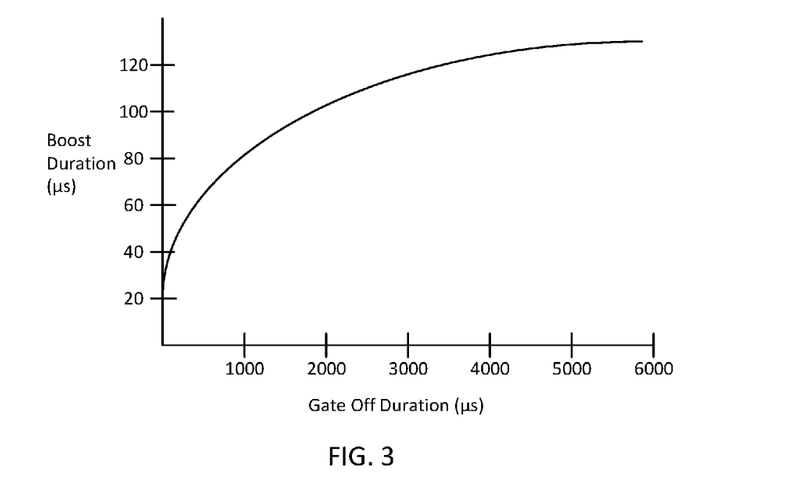
FIG. 3 is a plot pump current boost duration with respect to a gate signal off duration.

As can be seen in the example of FIGS. 2A-2B, in each subsequent on-signal state, each accompanying preceding off-signal state is of successively longer duration. For example, off-signal state 204B has a longer duration than off-signal state 204A so that a pump boost current 208B is applied at the on-signal state 206C with a longer pump boost duration than a pump boost current 208A at the corresponding on-signal state 206B. Also, as shown in FIG. 3, an increasing preceding off duration associated with the off-signal state corresponds to an increasing $T_{BOOST}$ of the pump boost current. FIG. 3 plots pump boost duration as a function of gate signal off time for a selected pulsed output beam average power where the pulses of the pulsed output beam have suitable rise time and overshoot characteristics. Thus, given a variable gate signal input to a laser system, a pump boost current can be applied based on the off duration of the gate signal so that the pulsed output beam of the laser system can have a rapid rise time with minimal overshoot. It will be appreciated that pump boost currents can have various configurations. For example, a pump boost current 210B can have a variable duration and variable magnitude compared to another pump boost current 210A. Pump boost current 210C illustrates a variation of pump boost current through the duration of the pump boost current 210C.

Figure 4:
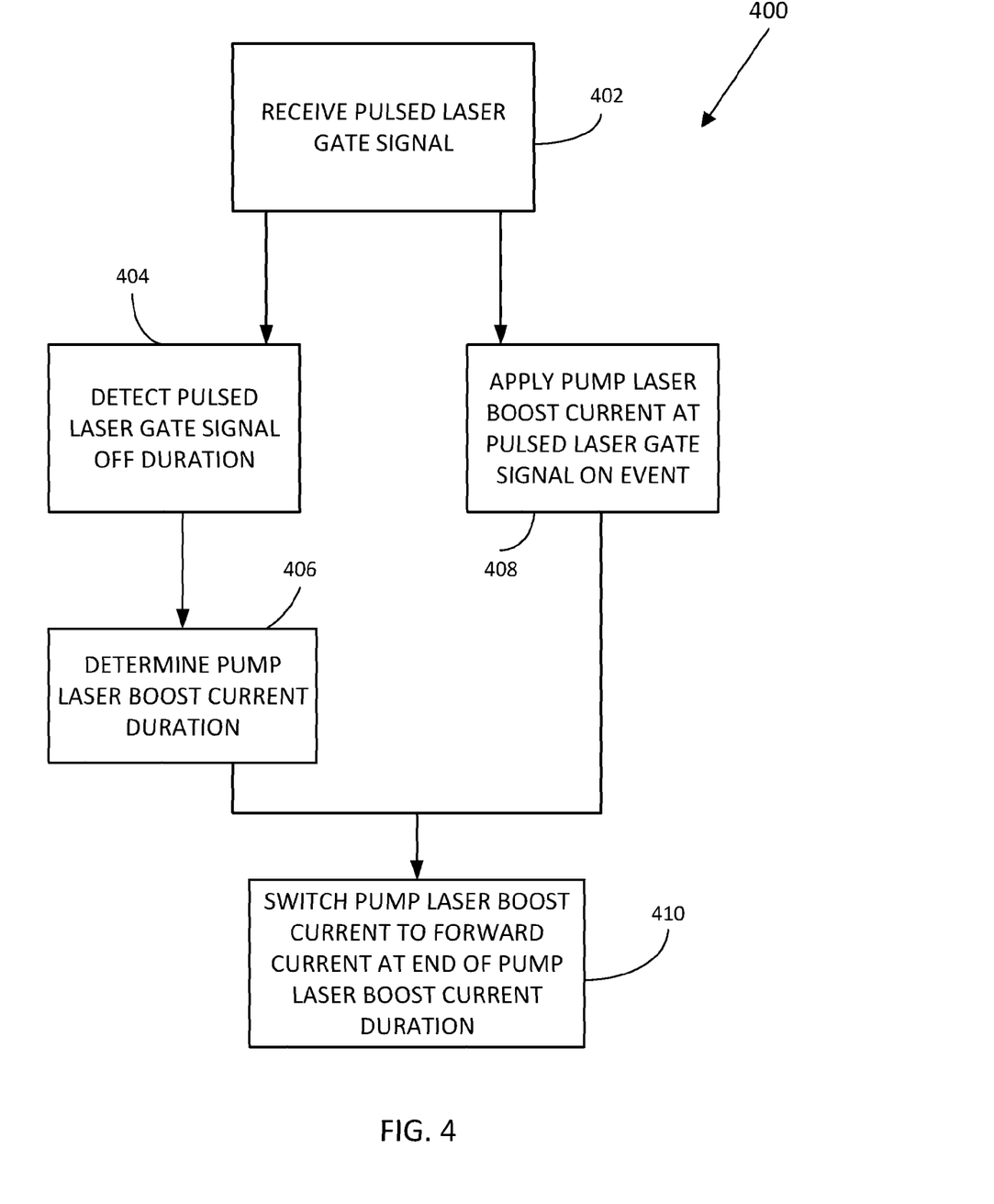
FIG. 4 is a flowchart of a representative method for controlling pump currents in a laser apparatus.

With reference to FIG. 4, a method 400 includes, at 402, receiving a pulsed laser gate signal. In typical examples, the pulsed laser gate signal is received from an external source, such as a manufacturing apparatus, by a laser apparatus. In other examples, the pulsed laser gate signal can be received by a computer and preloaded into memory or storage. The pulsed laser gate signal typically includes a sequence of on- and off-signals of various durations. Such durations typically correspond to active and inactive operation of the laser apparatus in the processes associated with the manufacturing apparatus. For example, the processes can include pulsed laser processing of a flat or contoured target where selected portions are to be processed with laser pulses and other unselected portions of the target are to remain unprocessed so as to produce a laser patterned target. During the period of scanning the beam from a selected portion past an unselected portion to another selected portion, the laser pulse emissions are ceased in accordance with the gate signal so as to avoid laser pulse emission to the unselected portions.

At 404, an off duration associated with the pulsed laser gate signal is detected. Typically, the off duration is associated with the off-signal of the pulsed laser gate signal. It will be appreciated that gate signals can take various forms, and "on" and "off" are high level abstractions. In typical examples, the pulsed laser gate signal has a digital form with the on-signal corresponding to a one and the off-signal corresponding to a zero. At 406, based on the detected off duration, a pump laser boost current duration is determined. At 408, the determined pump laser boost current is applied at the on-signal of the pulsed laser gate signal following the off-signal. In representative examples, the pump laser boost currents determined at 406 correspond to suitable rise times and overshoots for the laser pulses of the laser apparatus when the pump laser boost currents are applied to a pump laser of the laser apparatus. At 410, the pump laser boost current is switched to a pump laser forward current at the termination of the pump laser boost current duration. In some examples, a pump laser boost current magnitude is used instead of or in addition to a pump laser boost current duration. In further examples, an off duration is detected from the pump laser of the laser apparatus instead of or in addition to the pulsed laser gate signal.

Figure 5:
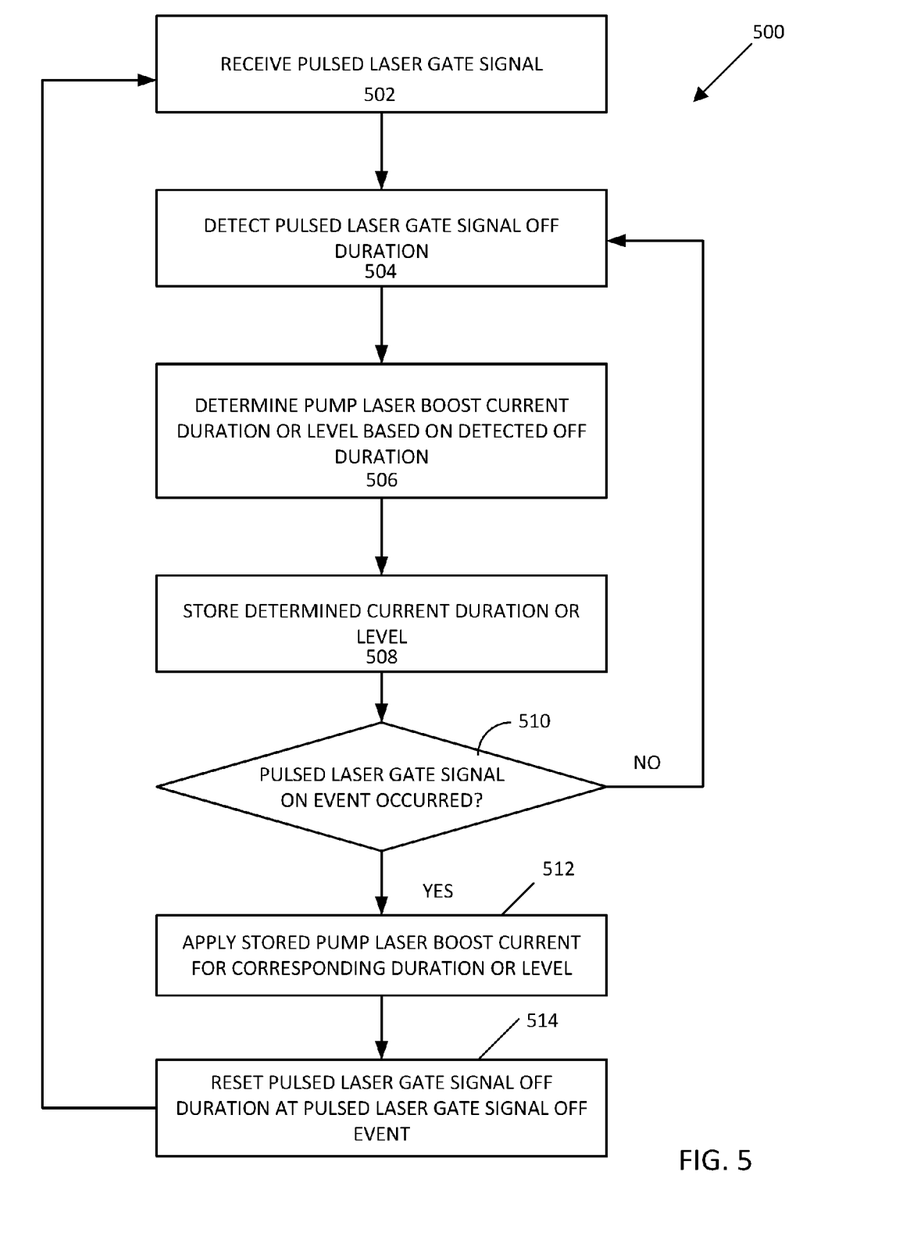
FIG. 5 is a flowchart of another representative method for controlling pump currents in a laser apparatus.

Referring to FIG. 5, a method 500 includes, at 502, receiving a pulsed laser gate signal that includes on- and off-signals associated with a laser system. At 504, an off duration associated with the off-signal of the pulsed laser gate signal is detected. At 506, a pump laser boost current duration or magnitude based on the off duration detected at 504 is determined, and, at 508, the determined pump laser boost current duration or magnitude is stored in a memory. At 510, a check for whether a pulsed laser gate signal on-signal has occurred is performed. If the pulsed laser gate on-signal has not yet occurred, the process of detecting a pulsed laser gate signal off duration is reinitiated at 504. If the pulsed laser gate on-signal has occurred, at 512, the stored pump laser boost current is applied to a pump driver for the corresponding duration or level (or both) so as to drive a pump laser in a pulsed laser system. After the pulsed laser gate signal on-signal is terminated, i.e., corresponding to the initiation of a subsequent pulsed laser gate off-signal, at 514, the stored off duration is reset and the receipt and detection of off duration is reinitiated at 502. The stored off duration may also be reset following termination of the application of the stored pump laser boost current. As the detected off duration increases, the stored pump boost current duration can update so as to be readied for application to the pump laser when the pulsed laser gate on-signal occurs. In further examples, the pump laser boost current duration or level is determined by comparing the detected pulsed laser gate signal off duration to a look-up table so that the pump current duration is not stored in memory.

Figure 6:
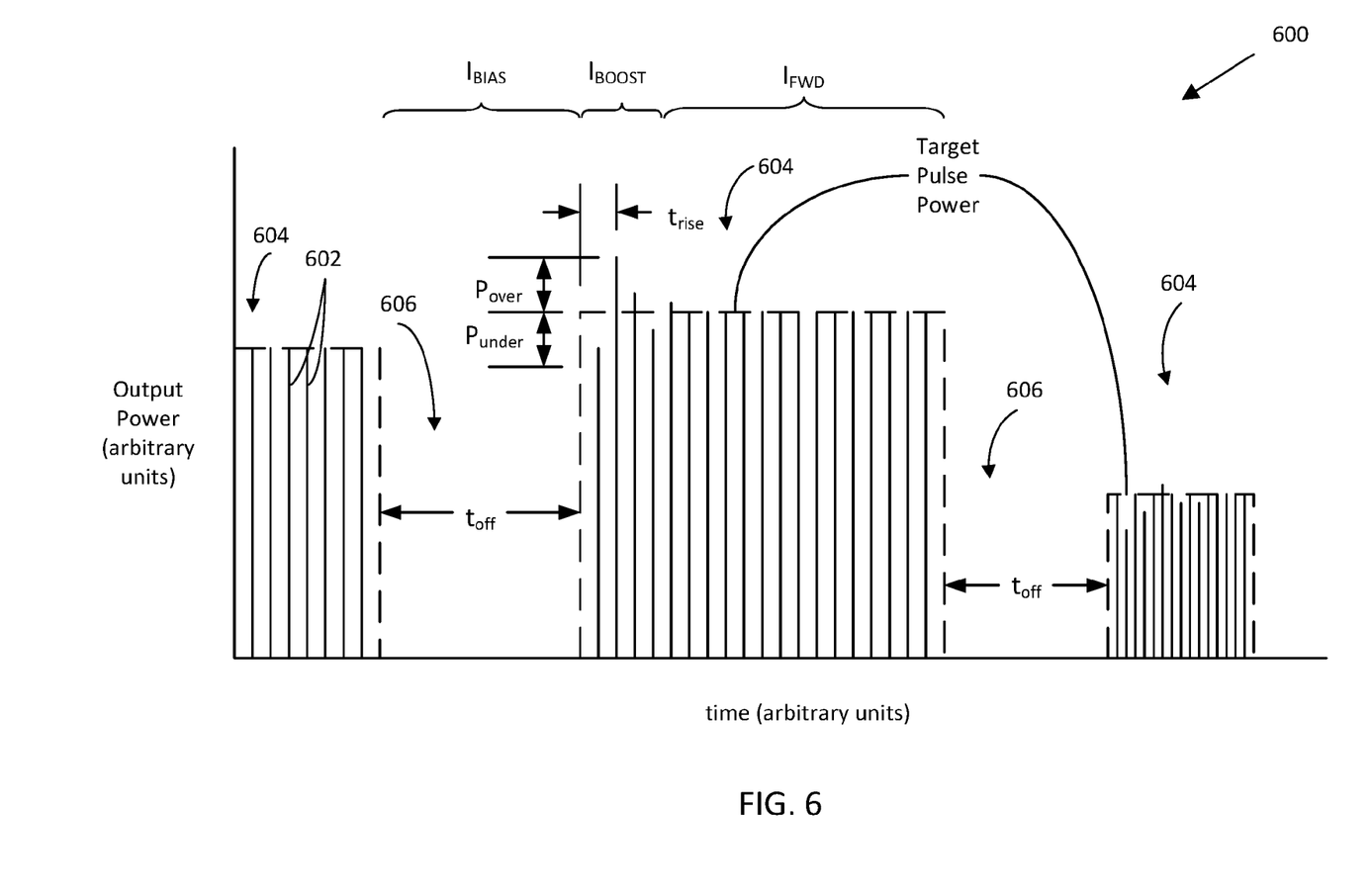
FIG. 6 is a plot of output pulse power for a pulsed laser output beam of a laser system with respect to time.

In FIG. 6, a plot 600 of output pulse power with respect to time is shown for a pulsed laser output beam of a laser system. Output pulses or pulse groups 602 are generated by the laser system with a selected target pulse power and repetition rate. The output pulses 602 are generated according to a gate signal having on-signal portions 604 associated with pulse emission and off-signal portions 606 associated with pulse suppression. Typically, at the initiation of the on-signal portions 604, seed pulses are generated that become amplified in a fiber amplifier pumped by a pump laser. The pump laser receives a bias current $I_{BIAS}$ during the off-signal portions 606 that include corresponding off durations $t_{off}$ of the pulsed output beam. Based on the off duration $t_{off}$, a variable boost current $I_{BOOST}$ is applied to the pump laser at the initiation of the subsequent on-signal portion 604. The boost current $I_{BOOST}$ can have a variable duration or magnitude (or both) corresponding to the off duration $t_{off}$.

After the initiation of the on-signal portion 604, the output pulses 606 can have a characteristic rise time $t_{rise}$, power overshoot $P_{over}$, and power undershoot $P_{under}$. For example, the rise time $t_{rise}$ may be found to be unduly long for the on-signal portion 604 such that one or more output pulses 602 fail to reach the selected target pulse power. The subsequent on-signal portion 604 may have a suitable rise time $t_{rise}$ to a different duration of the off duration $t_{off}$ between the corresponding on-signal portions 604. The variable boost current $I_{BOOST}$ to the on-signal portion 604 can be applied adaptably, with a selected magnitude, duration, or both, based on the preceding off duration $t_{off}$, so as to produce a suitable rise time $t_{rise}$, power overshoot $P_{over}$, and power undershoot $P_{under}$ as on portions 604 and off portions 606 of the gate signal or other associated laser system characteristic (e.g., pump mp laser power, output pulse power) vary in duration. In some examples, rise times $t_{rise}$ achieved given variability in off durations $t_{off}$ can be less than about 100 µs, 10 µs, 1 µs, 0.1 µs, 0.01 µs, or shorter. In further examples, power overshoots $P_{over}$ and $P_{under}$ can be within about 50%, 10%, 5%, 2%, 0.5%, or less of a selected target pulse power.

Figure 7:
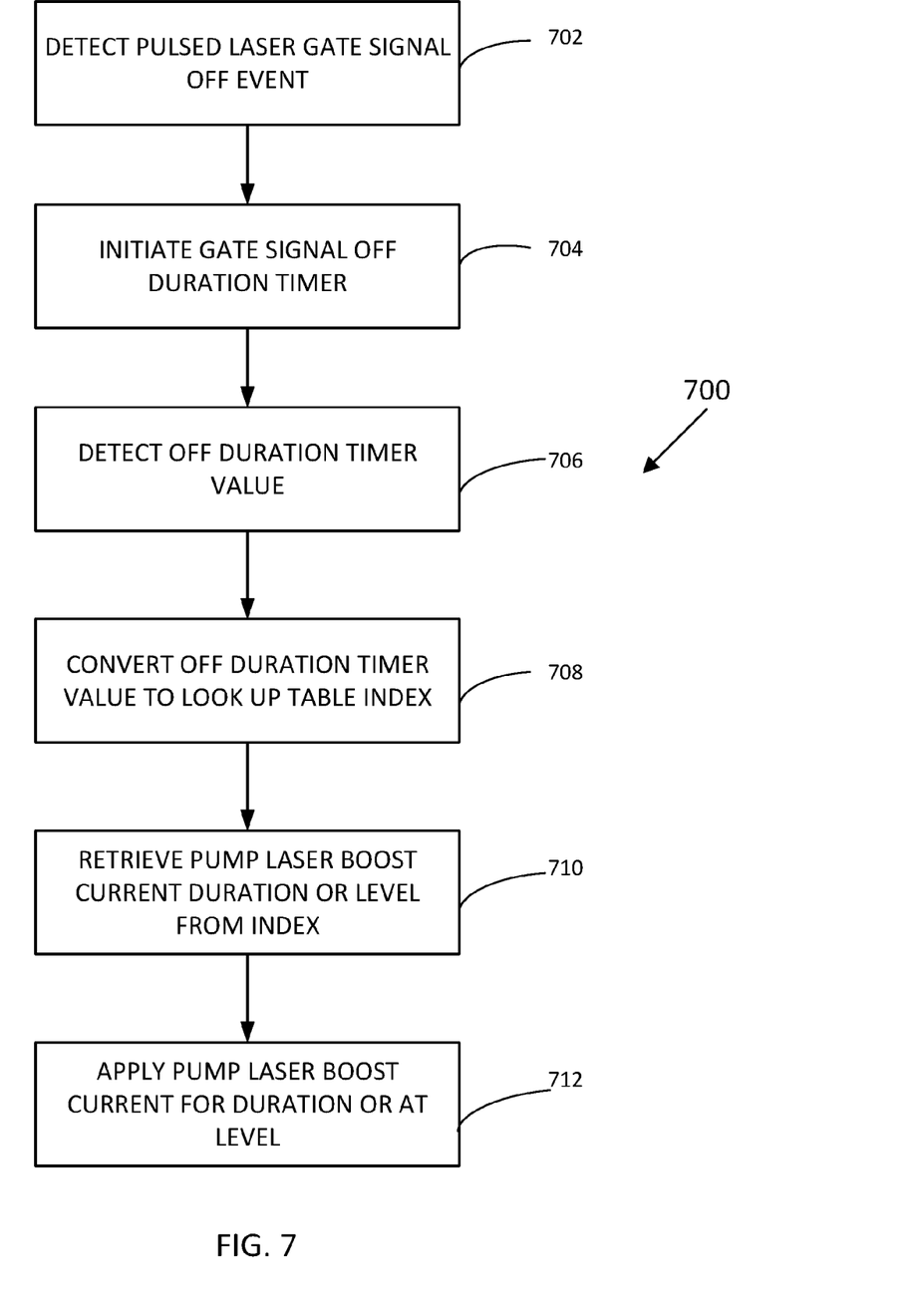
FIG. 7 is a flowchart of representative method for controlling pump currents in a laser system.

FIG. 7 illustrates a method 700 that includes, at 702, detecting an off event associated with a pulsed laser gate signal or associated laser system characteristic, such as a measured or detected current of a pump laser, a laser system output pulse power, etc. At 704, a gate signal off duration timer is initiated after detecting the off event at 702. For example, the off event at 702 may be associated with a termination of a preceding pulsed laser gate signal. At 706, an off duration timer value is detected. Such detection can occur on a rolling or periodic basis as the timer increments via storage of the timer value in memory. Such detection may also occur at the termination of the off duration, such as with the initiation of a subsequent on event associated with the pulsed laser gate signal. At 708, the off duration timer value is converted to an index in a look-up table. The look-up table can include a plurality of indices corresponding to different timer values or ranges of values. Each look-up table index can further be associated with values for pump laser boost current duration or magnitude. At 710, pump laser boost current durations or magnitudes are retrieved based on the look-up table index associated with the detected timer value. At 712, the retrieved pump laser boost current/magnitude is applied to a pump laser of the laser system.

Figure 8:
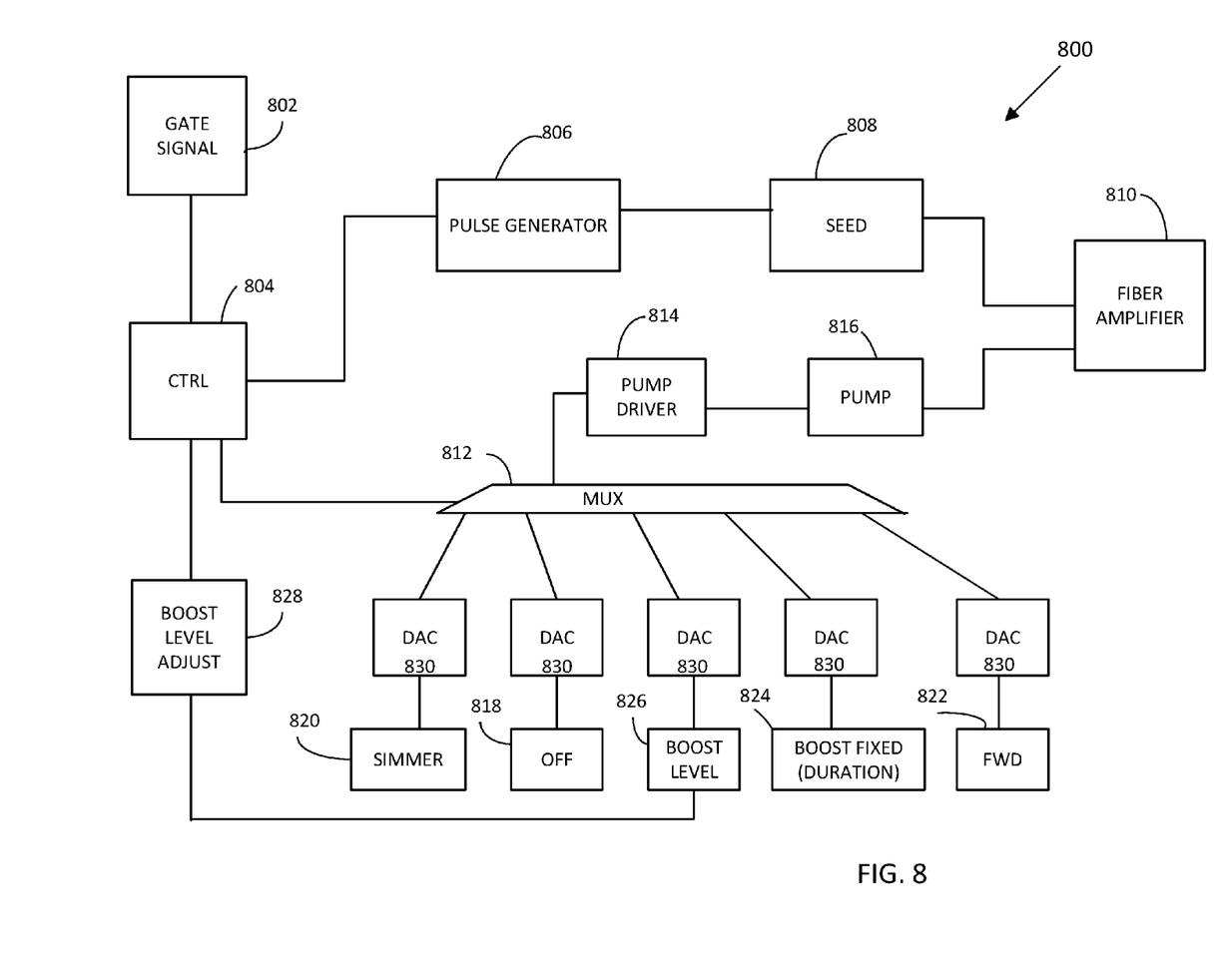
FIG. 8 is a schematic of a representative laser system situated to generate amplified output pulses to a manufacturing system.

In FIG. 8, a laser system 800 includes a gate signal 802 received by a controller 804. The gate signal 802 can be received by an external source, such a manufacturing apparatus (not shown) integrating the laser system 800 for laser processing different targets or workpieces. The controller 802 is coupled to a pulse generator 806 that is configured to initiate seed pulses in a seed laser 808 coupled to the pulse generator 806. The seed pulses are directed to a fiber amplifier 810 for subsequent amplification. The controller 804 is also coupled to a multiplexer 812 for selecting currents associated with a pump driver 814 that provides the selected current to a pump source 816. The pump source 816 supplies optical energy via absorption to active dopants in a core of the fiber amplifier 810 so as to provide amplification of the seed pulses propagating through the fiber amplifier 810.

The controller 802 selects between an off current, a simmer current, a forward current, or a fixed boost current, each of which can be stored in respective memory portions 818, 820, 822, 824 of the controller 802 or associated control components. The controller 802 can also select a variable boost current 826 that is adjusted with a boost level adjust 828. The values of the currents are sent to a respective DAC 830 that provides the corresponding analog value to the multiplexer 812. In representative examples, the controller 802 is situated to apply a fixed boost current 824 or a variable boost current 826 based on characteristics of the gate signal 802, such as an off duration of the gate signal 802 preceding an on event of the gate signal 802. Other level adjusts for current may be used as well, including for bias and forward currents, and such values can similarly correspond to an off duration.

Figure 9:
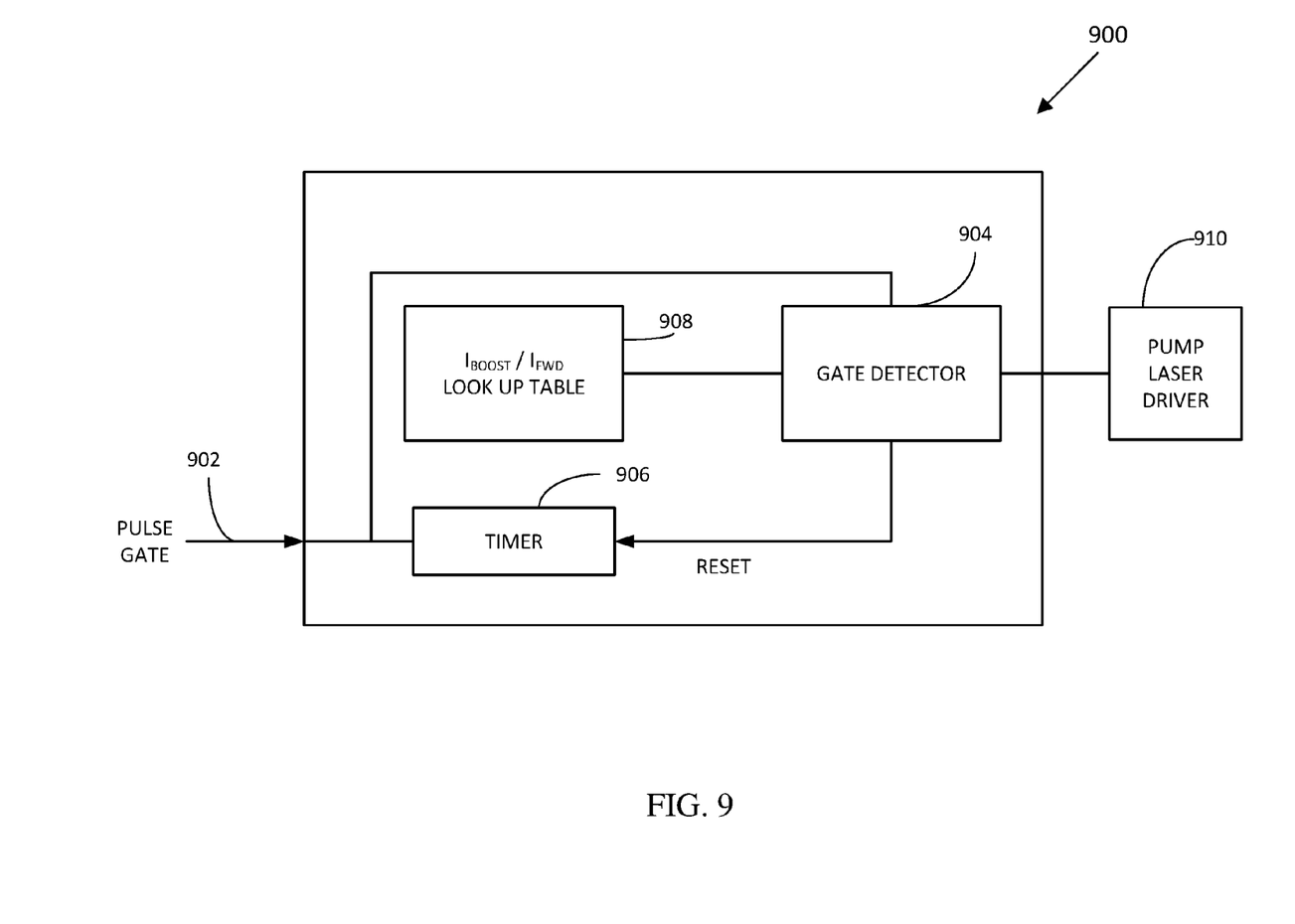
FIG. 9 is a schematic of a representative variable pump driver system.

Referring to FIG. 9, a variable pump driver system 900 includes a gate signal input 902 and a gate detector 904 and timer 906 coupled to the gate signal input 902. A look-up table 908 stores values for boost currents and forward currents. The gate detector 904 can pass the stored current value to a pump laser driver 910 based on characteristics of the gate signal, such as on events, off events, and offsets from on events and off events. The gate detector 904 is also coupled to the timer 906 so as to trigger a reset based on characteristics of the gate signal. In representative examples, the timer 906 is initiated at an off event associated with the gate signal. Upon receiving an on event associated with the gate signal, the gate detector 904 directs the pump driver 910 to provide a boost current for a selected duration and a forward current after the selected duration until a subsequent off event associated with the gate signal. At the subsequent off event, the timer 906 can be reset or reinitiated until the next on event.

Figure 10:
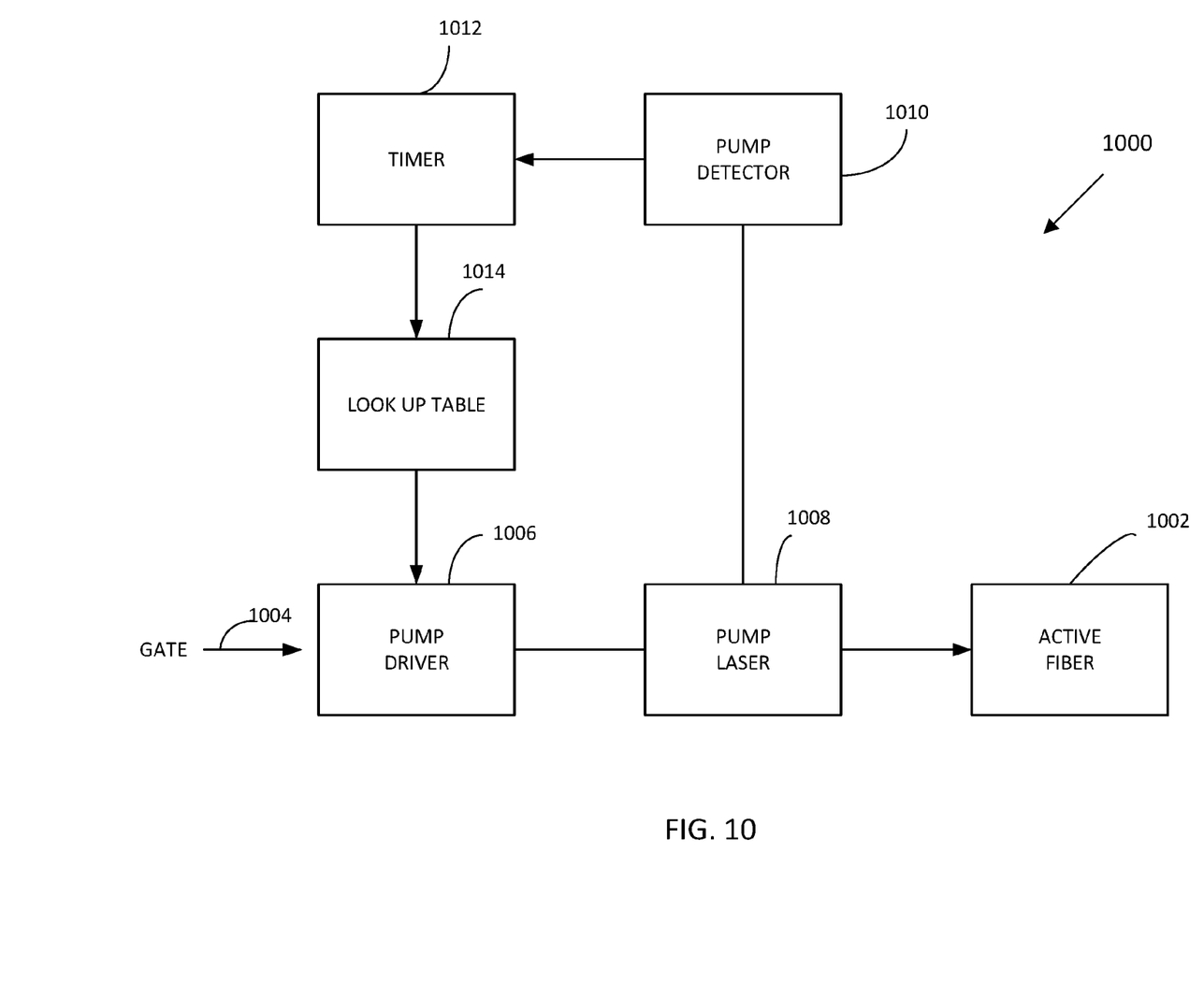
FIG. 10 is a schematic of a representative system for pumping an active fiber.

FIG. 10 illustrates a system 1000 for pumping an active fiber 1002 that includes a gate input 1004, a pump driver 1006 situated to receive a gate signal, a pump laser 1008 situated to receive a current from the pump driver 1006, and a pump detector 1010 coupled to the pump laser 1008. The pump laser 1008 pumps the active fiber 1002 so as to amplify an optical signal directed to the active fiber 1002. The pump detector 1010 is situated to detect one or more characteristics associated with the pump laser 1008. In some examples, the pump detector 1010 detects a current associated with the pump laser 1008, and can be coupled to the pump driver 1006. In other examples, the pump detector 1010 detects an optical characteristic of pump light emitted from the pump laser 1008, such as optical power. A timer 1012 is coupled to the pump detector 1010 and can be initiated upon termination of pump laser output to the active fiber 1002, such as the end of a gate signal associated with the gate. The timer 1012 is in communication with a look-up table 1014 that includes pump laser current values, such as pump laser current durations or magnitudes, that can be provided to the pump driver to generate the corresponding current. By adaptably adjusting the current of the pump laser 1008, a more advantageous pulse output can be achieved by the active fiber 1002 in relation to the gate 1004.

Figure 11:
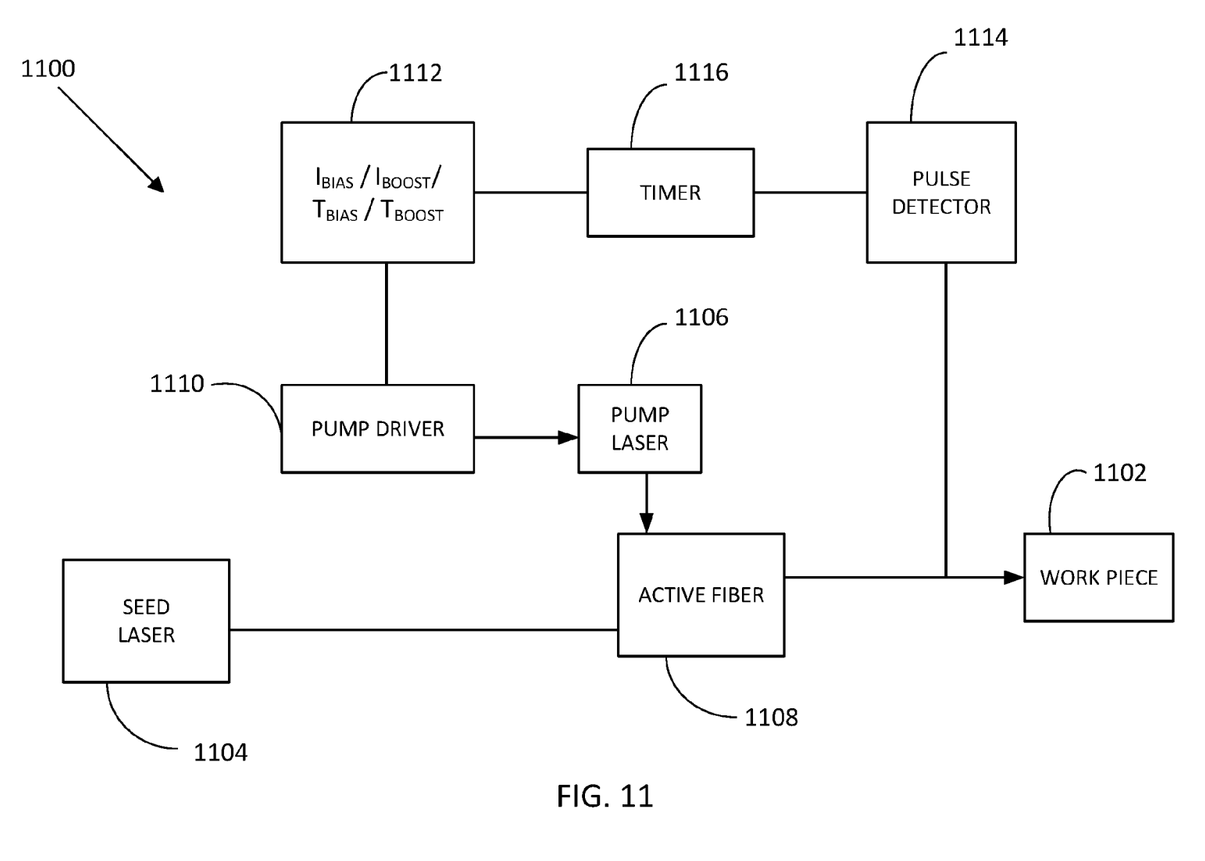
FIG. 11 is a schematic of a representative laser system for laser processing a workpiece.

FIG. 11 depicts a laser system 1100 situated to laser process a workpiece 1102. The laser system 1100 includes a seed laser 1104 and pump laser 1106 optically coupled to an active fiber 1108. The active fiber 1108 generates a pulsed laser beam that is directed to the workpiece 1102 for laser processing. The pump laser 1106, which typically includes a plurality of electrically pumped diode lasers, is activated by a pump driver 1110 situated to generate one or more pump driver currents. The pump driver currents are selected from various current values stored in a memory 1112. Current values can include modulated or fixed values. In representative examples, stored current values include bias currents $I_{BIAS}$, boost currents $I_{BOOST}$, as well as timing values, or durations such as $T_{BIAS}$ and $T_{BOOST}$ associated with the current values. A pulse detector 1114 is situated to receive a portion of the pulsed laser beam from the active fiber 1108. For example, a beam sampler may be situated in the propagation path of the pulsed laser beam so as to direct a portion of the pulsed laser beam to the pulse detector 1114. The pulse detector 1114 is coupled to a timer 1116 that triggers based on the detection (or absence of detection) of the portion of the pulsed laser beam received by the pulse detector 1114. Based on values associated with the timer, appropriate current values 1112 and corresponding current durations can be selected to drive the pump laser at magnitudes and durations suitable for pumping the active fiber 1108. In some examples, the gate signal, pump laser, and output pulse characteristics can be used to determine suitable pump current durations or magnitudes. For example, a gate signal on-state may be used with a detected output pulse off-state.

Figure 12:
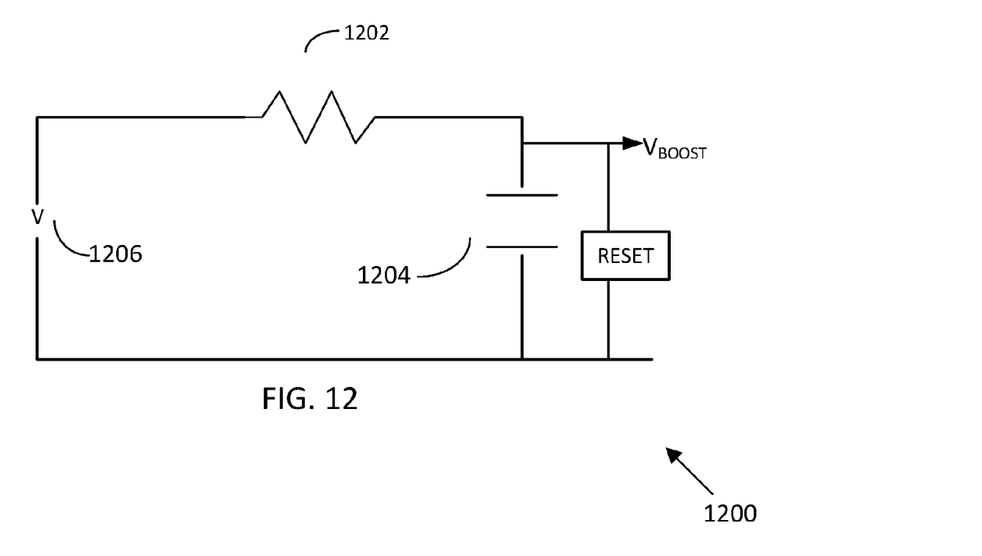
FIGS. 12-13 are schematic circuit diagrams of representative laser system timers.
Figure 13:
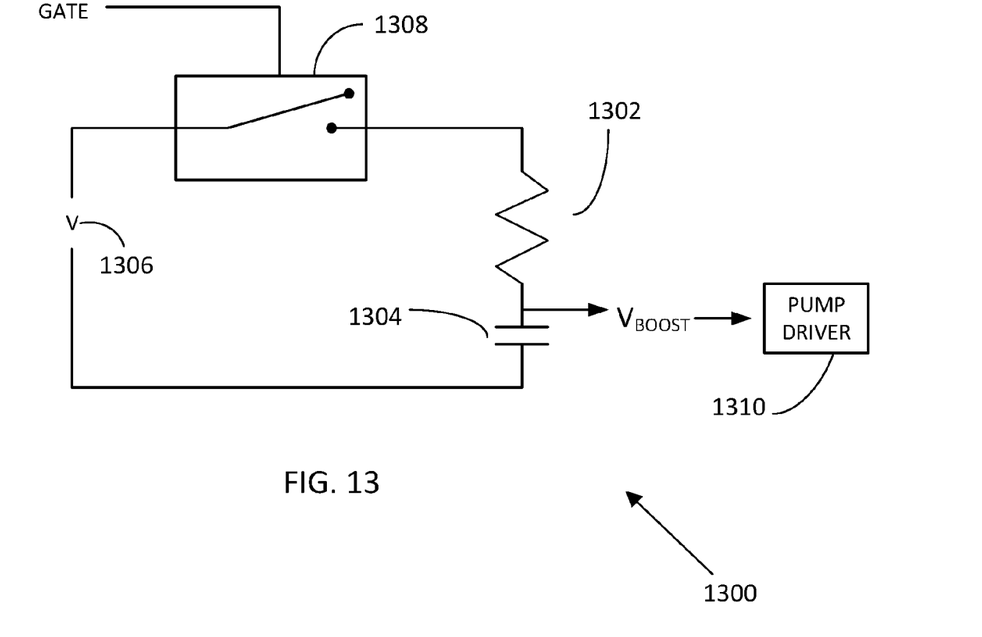

In FIGS. 12 and 13, simplified timers 1200, 1300 include series resistors 1202, 1302 and capacitors 1204, 1304 coupled to voltage sources 1206, 1306. A voltage $V_{BOOST}$ associated with the capacitor 1204 can vary relative to a discharge state of the capacitor 1204 and as a function of time. Thus, with a reset 1208 situated to controllably discharge the capacitor, $V_{BOOST}$ can temporally vary in association with the reset 1208. The reset 1208 can be coupled to various laser system components so as to receive reset commands, such as a gate or pump laser detector. The variable $V_{BOOST}$ can be applied to the laser system so as to select a corresponding pump driver output for a pump laser of the laser system. The timer 1300 includes a switch 1308 coupled between the voltage source 1306 and resistor 1302. The switch 1308 is coupled to a gate signal that opens and closes the switch 1308 in accordance with the gate signal. A voltage $V_{BOOST}$ associated with the capacitor 1304 varies relative to the open or closed state of the switch 1308. The corresponding voltage $V_{BOOST}$ can be applied to a pump driver 1310 so that the pump driver 1310 can provide an associated pump driver current. For example, timers 1200, 1300 may be used to determine an off duration associated with a gate signal, pump laser, or output beam associated with a laser system.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
   detecting an off duration associated with a laser system;
   applying a boost pump signal to a pump laser of the laser system based on the preceding off duration; and
   applying a forward pump signal to the pump laser.

2. The method of claim 1, wherein the off duration is associated with a laser gate signal, and the boost pump signal is applied in response to the laser gate signal.

3. The method of claim 1, wherein the off duration is associated with the pump laser.

4. A method, comprising:
   determining a duration of a boost pump signal for a pump laser of a laser system based on stored pump signal values associated with a plurality of off durations;
   applying the boost pump signal to the pump laser based on a preceding off duration associated with the laser system; and
   applying a forward pump signal to the pump laser.

5. The method of claim 4, further comprising:
   applying the boost pump signal in response to a gate signal;
   wherein the forward pump signal is applied upon completion of the boost pump signal.

6. The method of claim 5, wherein the boost pump signal is selected based on a laser system output pulse rise time and overshoot.

7. A method, comprising:
   determining a magnitude of a boost pump signal for a pump laser of a laser system based on stored pump signal magnitudes associated with a plurality of off durations;
   applying the boost pump signal to the pump laser based on a preceding off duration associated with the laser system; and
   applying a forward pump signal to the pump laser.

8. The method of claim 7, wherein a duration of the boost pump signal is common for at least two off durations.

9. A method, comprising:
determining a duration of a boost pump signal for a pump laser of a laser system based on stored pump signal durations or gate signal durations;
applying the boost pump signal to the pump laser based on a preceding off duration associated with the laser system; and
applying a forward pump signal to the pump laser.

10. A method, comprising:
determining a boost pump signal duration for a pump laser of a laser system before receiving a gate signal;
applying the boost pump signal to the pump laser based on a preceding off duration associated with the laser system; and
applying a forward pump signal to the pump laser.

11. The method of claim 5, wherein the boost pump signal is switched to the forward pump signal based on the off duration and a laser beam output power.

12. The method of claim 1, wherein the off duration is detected from one or more of a gate signal, pump current, pump power, and pulse power.

13. A laser system, comprising:
a seed laser situated to generate seed optical pulses;
a pump laser situated to generate pump optical radiation;
a fiber amplifier situated to receive the pump optical radiation and the seed optical pulses; and
a controller situated to select a pump boost duration or pump boost magnitude based on an off duration associated with the laser system.

14. The laser system of claim 13, wherein the duration of the pump boost is based on the off duration.

15. The laser system of claim 13, wherein the magnitude of the pump boost is based on the off duration.

16. The laser system of claim 15, wherein the magnitude of the pump boost is constant.

17. The laser system of claim 15, wherein the magnitude of the pump boost varies during the pump boost duration.

18. The laser system of claim 14, wherein the duration of the pump boost varies based on the off duration and a laser system output power.

19. The laser system of claim 13, further comprising:
a memory that stores pump boost durations or pump boost magnitudes corresponding to a plurality of off durations; and
programmable logic configured to obtain the selected pump boost duration or pump boost magnitude based on the stored pump boost durations or pump boost magnitudes and the off duration.

20. The laser system of claim 19, wherein the memory stores pump boost durations and pump boost magnitudes for the plurality of off durations, and the programmable logic obtains stored pump boost durations or pump boost magnitudes based on the stored pump boost durations and the stored pump boost magnitudes.

21. The laser system of claim 19, wherein the pump boost durations or pump boost magnitudes are obtained so as to correspond to an output pulse rise time and overshoot.

22. The laser system of claim 13, further comprising:
a pulse detector situated to detect amplified optical pulses of the laser system;
a timer situated to provide the off duration by timing a duration between detected amplified optical pulses.

23. The laser system of claim 13, further comprising a gate detector situated to detect a gate signal associated with the seed optical pulses;
wherein the off duration is associated with the detected gate signal.

24. The laser system of claim 13, further comprising a current detector situated to detect a pump current of the pump laser;
wherein the off duration is associated with the detected pump current.

25. A method, comprising:
detecting an off duration associated with termination of a first gating signal and initiation of a second gating signal;
applying a first pump laser current in response to the second pulsed gating signal, the first pump laser current having a duration associated with the detected off duration; and
switching the first pump laser current to a second pump laser current upon termination of the first pump laser current.

* * * * *